(12) United States Patent
Hiramoto et al.

(10) Patent No.: US 7,730,597 B2
(45) Date of Patent: Jun. 8, 2010

(54) METHOD FOR PROCESSING METAL MOLDING MEMBER HAVING FINE CONFIGURATION, METHOD FOR MANUFACTURING METAL MOLDING MEMBER, EXTRUSION DIE, METHOD FOR MANUFACTURING EXTRUDED MEMBER, AND EXTRUDED MEMBER

(75) Inventors: Kimihisa Hiramoto, Tochigi (JP); Hidemitsu Hamano, Tochigi (JP)

(73) Assignee: Showa Denko K. K., Tokyo (JP)

( * ) Notice: Subject to any disclaimer, the term of this patent is extended or adjusted under 35 U.S.C. 154(b) by 0 days.

(21) Appl. No.: 10/507,697

(22) PCT Filed: Mar. 26, 2003

(86) PCT No.: PCT/JP03/03690

§ 371 (c)(1),
(2), (4) Date: Sep. 23, 2004

(87) PCT Pub. No.: WO03/080266

PCT Pub. Date: Oct. 2, 2003

(65) Prior Publication Data

US 2005/0102809 A1    May 19, 2005

Related U.S. Application Data

(60) Provisional application No. 60/374,521, filed on Apr. 23, 2002.

(30) Foreign Application Priority Data

Mar. 26, 2002    (JP) ............................... 200286296

(51) Int. Cl.
*B21C 43/00* (2006.01)
*B23H 7/00* (2006.01)
*B21K 5/20* (2006.01)

(52) U.S. Cl. ................. 29/81.01; 29/81.08; 219/69.12; 219/69.17; 76/107.1

(58) Field of Classification Search .............. 29/81.01, 29/81.08, 557, 558; 219/69.12, 69.17; 76/107.1
See application file for complete search history.

(56) References Cited

U.S. PATENT DOCUMENTS 5,263,352 A * 11/1993 Yano ........................... 72/269

(Continued)

FOREIGN PATENT DOCUMENTS

EP    1 174 198 A2    1/2002

(Continued)

*Primary Examiner*—David P Bryant
*Assistant Examiner*—Sarang Afzali
(74) *Attorney, Agent, or Firm*—Oblon, Spivak, McClelland, Maier & Neustadt, L.L.P.

(57) ABSTRACT

A molten residual layer formed on a surface 26 of an electric-discharge machined portion 12 of a metal molding member 1 is eliminated by using a tool 70 made by a wire discharge grinding method. According to the wire discharge grinding method, a minute tool which high in processing accuracy and high in hardness can be obtained. Since the molten residual layer formed on a surface 26 of the portion 12 due to the electric-discharge machining is eliminated by using the tool, the molten residual layer can be eliminated uniformly with high accuracy.

7 Claims, 8 Drawing Sheets

U.S. PATENT DOCUMENTS 5,976,347 A * 11/1999 Wakabayashi et al. ...... 205/640
6,354,361 B1 * 3/2002 Sachs et al. ................. 164/128

FOREIGN PATENT DOCUMENTS

| | | |
|---|---|---|
| JP | 05-261624 | 10/1993 |
| JP | 07-060547 | 3/1995 |
| JP | 08-243927 | 9/1996 |
| JP | 10-156424 | 6/1998 |
| JP | 10-156626 | 6/1998 |
| TW | 384743 | 3/2000 |

* cited by examiner

METHOD FOR PROCESSING METAL MOLDING MEMBER HAVING FINE CONFIGURATION, METHOD FOR MANUFACTURING METAL MOLDING MEMBER, EXTRUSION DIE, METHOD FOR MANUFACTURING EXTRUDED MEMBER, AND EXTRUDED MEMBER

Priority is claimed to Japanese Patent Application No. 2002-86296, filed on Mar. 26, 2002 and U.S. Provisional Patent Application No. 60/374,521, filed on Apr. 23, 2002, the disclosures of which are incorporated by reference in their entireties.

CROSS REFERENCE TO RELATED APPLICATIONS

This application is an application filed under 35 U.S.C. §111(a) claiming the benefit pursuant to 35 U.S.C. §119(e)(1) of the filing date of U.S. Provisional Application No. 60/374,521 filed on Apr. 23, 2002 pursuant to 35 U.S.C. §111(b).

TECHNICAL FIELD

The present invention relates to a method for processing a metal molding member having a minute configuration, a method for manufacturing a metal molding member, an extrusion die, a method for manufacturing an extruded member and an extruded member.

BACKGROUND ART

In general, as a material of a metal molding member such as an extrusion die, a material excellent in abrasion resistance such as forged die steel or cemented carbide is used. Since these materials are rigid, the workability is poor. Therefore, a processing method utilizing a discharge phenomenon as a processing principle, e.g., a wire electric-discharge machining or a carving electric-discharge machining in which workability is not generally harmed by strength of material, is widely used.

In the electric-discharge machining, a thermal melt elimination phenomenon of a material by discharge is used. Therefore, a molten residual layer (deformed layer) different from the base metal in quality will be formed on the surface of the machined object.

This layer has a structure transformed by melting and quenching, and includes micro cracks, a hardened layer (in cases where processing is executed in oil), a softened layer (in cases where processing is executed underwater) and/or tensile residual stress. Since high pressure will be applied to an extrusion die, if such a molten residual layer exists in the surface portion of the die, the micro cracks will act as starting points of destructions, resulting in a shortened die life. Furthermore, even in cases where a surface treatment is performed, the treatment may cause the exfoliation of the surface treated layer, which in turn shortens the life of the surface treatment.

As mentioned above, since the molten residual layer which exists in the surface of the processed portion of the metal molding member after the electric-discharge machining is harmful against the metal molding member, the molten residual layer is generally eliminated after the electric-discharge machining.

Conventionally, as a method for eliminating a molten residual layer of a metal molding member, various elimination methods, such as an Emery paper polish method, a gum polish method, a shot blast method, a barrel processing method and a honing method, are proposed (see, e.g., Japanese Unexamined Laid-open Patent Publication Nos. 10-156424, 11-123444, 11-244934 and 11-277131). Furthermore, a method for eliminating a molten residual layer by electrolytic polishing is also proposed (see, e.g., Japanese Unexamined Laid-open Patent Publication No. 9-41123).

However, the aforementioned method for eliminating a molten residual layer has the following drawbacks. That is, in cases where an electric-discharge machined portion has a minute configuration including, for example, a slot of less than 0.3 mm width, the method cannot cope with such a minute configuration. Furthermore, the strength of elimination processing varies from portion to portion and therefore a dull processed configuration will be generated, which deteriorates the processing dimensional accuracy.

Furthermore, the aforementioned electrolytic polishing elimination method has the following drawbacks. That is, in cases where the metal molding member is made of cemented carbide, some portions of a molding member will be eliminated preferentially by galvanic corrosion. Thus, the characteristics of the material cannot fully be used efficiently.

Furthermore, according to an elimination method using a common grinder, it was difficult to perform sufficient elimination processing in cases where a molding member has a minute processing configuration. Concretely, it was difficult to perform deep elimination processing (e.g., 10 times or more of width) when the slit has a width of about 0.3 mm.

Furthermore, there were another drawbacks as follows. When a popular disk-shaped grinder is used as a tool for the elimination processing, the elimination processing range will be limited. In cases where a tool having a columnar or rectangular cross-section other than a disk-shaped tool is used, if the diameter of the tool is less than 0.3 mm, it becomes difficult to attach the tool to the grinder straightly, causing a breakage of the tool because of the unbalanced load due to eccentricity, which results in unsatisfactory elimination processing.

It is an object of the present invention to provide a method for processing a metal molding member having a minute configuration capable of uniformly eliminating a molten residual layer (deformed layer) of the aforementioned minute configuration portion of the metal molding member subjected to electric-discharge processing with high accuracy whereby the life can be extended and the function can be enhanced.

It is another object of the present invention to provide a method for manufacturing a metal molding member, an extrusion die, a method for manufacturing an extruded member and an extruded member.

Other objects and advantages of the present invention will be apparent from the following preferred embodiments.

DISCLOSURE OF INVENTION

According to the first aspect of the present invention, a method for processing a metal molding member comprises the step of eliminating a molten residual layer formed on a surface of an electric-discharge machined portion of a metal molding member by using a tool made by a wire discharge grinding method.

The wire discharge grinding method is one of electric-discharge machining methods. The features are as follows. (1) Although a discharge phenomenon using a wire electrode is used to form a tool, there is no deterioration of tool-forming-accuracy due to the processing (discharge) opposing force at the time of forming the tool since the wire guide, which guides a wire electrode, supports the wire electrode. 2)

Since a wire electrode is used to form a tool, the forming is always performed by a new surface of the wire electrode, and therefore there is no influence of consumption of electrode material. (3) Since the method uses a electric-discharge phenomenon, the method can be applied to various materials regardless of hardness of material so long as the material has conducting properties. Therefore, a hard tool which is harder than a die material such as sintered diamond, tungsten and cemented carbide can be manufactured. Furthermore, from the aforementioned reasons (1) and (2), the processing accuracy is high, and therefore a minute tool can be manufactured.

As will be understood from above, according to the wire discharge grinding method, a minute tool which is high in processing accuracy and high in hardness can be manufactured. Since a molten residual layer formed on a machined portion of a metal molding member due to electric-discharge machining will be eliminated by this tool, the molten residual layer can be eliminated uniformly with high accuracy.

According to the second aspect of the present invention, an extrusion die is a member made by eliminating a molten residual layer formed on a surface of an electric-discharge machined portion by using a tool made by a wire discharge grinding method.

In this extrusion die, since the molten residual layer formed on a surface of an electric-discharge machined portion can be eliminated by using a minute tool high in processing accuracy and high in hardness, a long-life high performance extrusion die from which the molten residual layer is eliminated uniformly with high accuracy can be obtained.

In this die too, the elimination of the molten residual layer may be performed by turning-cut machining or ultrasonic machining. The electric-discharge machined portion may have a minute configuration including a groove of 0.3 mm or less.

According to the third aspect of the present invention, a method for manufacturing an extrusion die comprises the step of extruding a billet through an extrusion die made by eliminating a molten residual layer formed on a surface of an electric-discharge machined portion by using a tool made by a wire discharge grinding method.

According to this method for manufacturing an extrusion die, since the extrusion is performed by using an extrusion die from which the molten residual layer of the electric-discharge machined portion is eliminated uniformly with high accuracy, an extruded member excellent in dimensional accuracy and excellent in surface characteristics can be obtained.

In this method too, the elimination of the molten residual layer may be performed by turning-cut machining or ultrasonic machining. The electric-discharge machined portion may have a minute configuration including a groove width of 0.03 mm or more but less than 0.3 mm, more preferably 0.05 to 0.25 mm.

According to the fourth aspect of the present invention, an extruded member is a member extruded by an extrusion die made by eliminating a molten residual layer formed on a surface of an electric-discharge machined portion by using a tool made by a wire discharge grinding method.

Since this extruded member is extruded by the extrusion die from which the molten residual layer formed on a surface of an electric-discharge machined portion is eliminated uniformly with high accuracy, the extruded member is high in dimensional accuracy and excellent in surface characteristics.

In this extruded member too, the elimination of the molten residual layer may be performed by turning-cut processing or ultrasonic machining. The electric-discharge machined portion may have a minute configuration including a groove width of 0.03 mm or more but less than 0.3 mm, more preferably 0.05 to 0.25 mm.

BEST MODE FOR CARRYING OUT THE INVENTION

An embodiment for the present invention will be described in detail with reference to the attached drawings.

Figure 8:
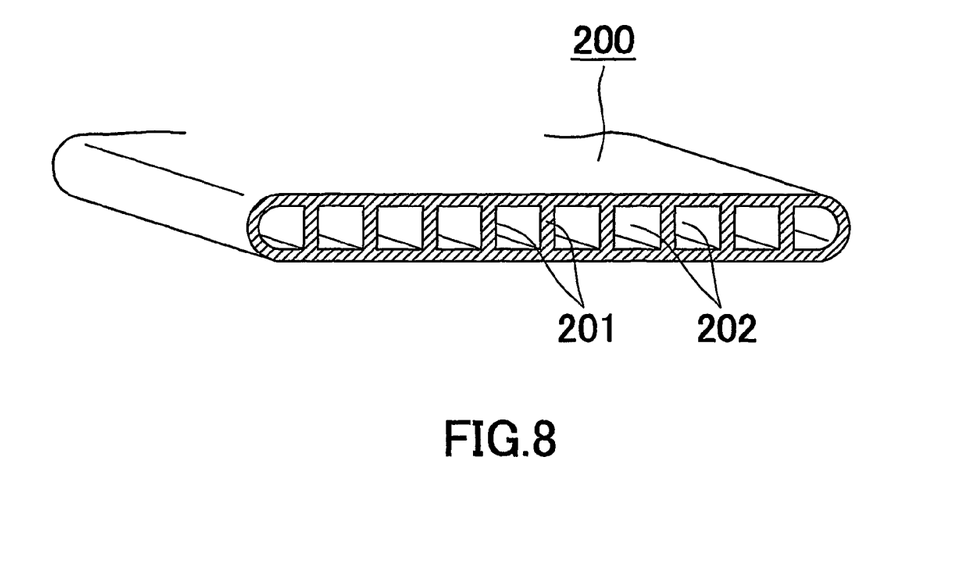
FIG. 8 is a cross-sectional perspective view showing an extruded aluminum tube to be manufactured by using the die shown in FIGS. 1 to 4.

In this embodiment, a metal molding member is an extrusion die. Furthermore, the extruded member to be manufactured by this extrusion die is an aluminum (including its alloy) flat multi-bored tube 200 having a number of small hollow portions 202 arranged in the widthwise direction via partitioning walls 201 as shown in FIG. 8. The tube is used as a heat exchanging tube for circulating refrigerant of a heat exchanger.

Figure 1A:
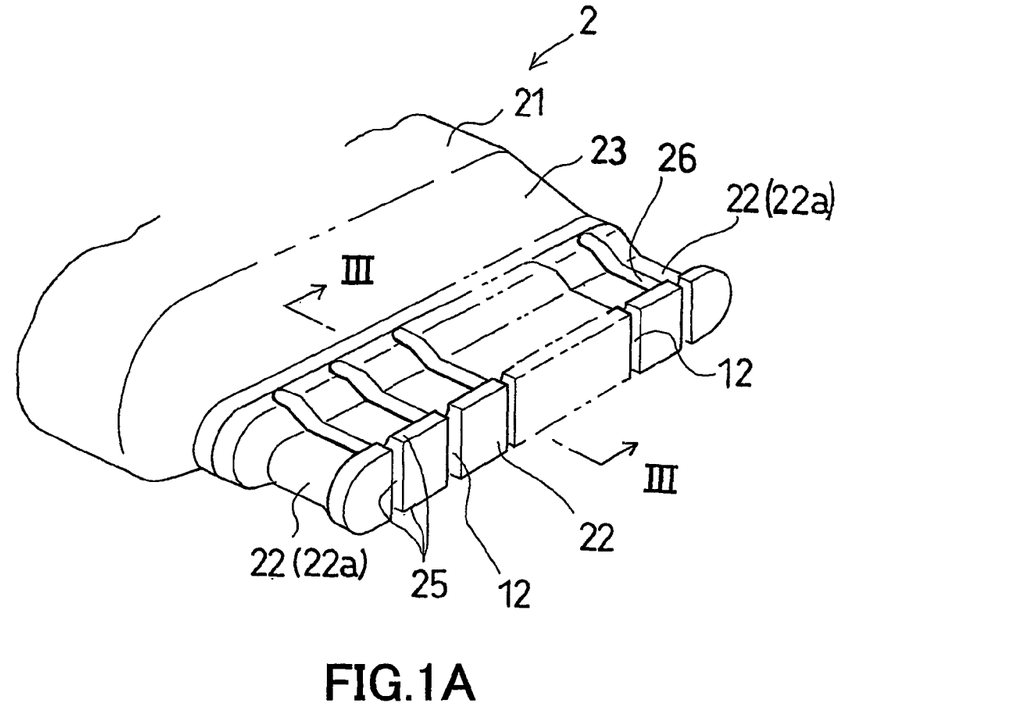
FIG. 1A is a perspective view showing a mandrel of an extrusion die according to an embodiment of the present invention.
Figure 2:
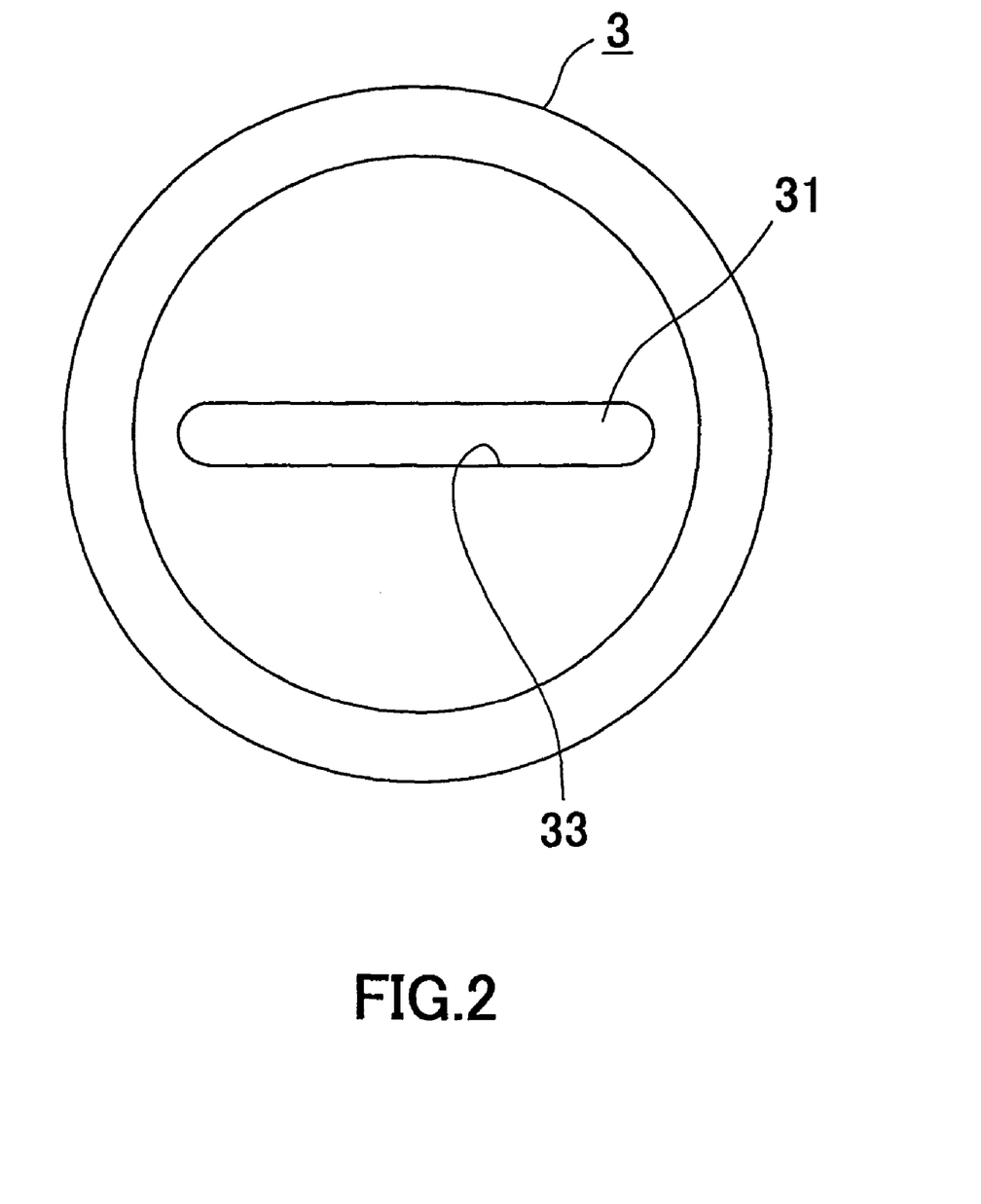
FIG. 2 is a front view showing the female-die of the extrusion die as seen from the extrusion direction rear side (inlet side).
Figure 3:
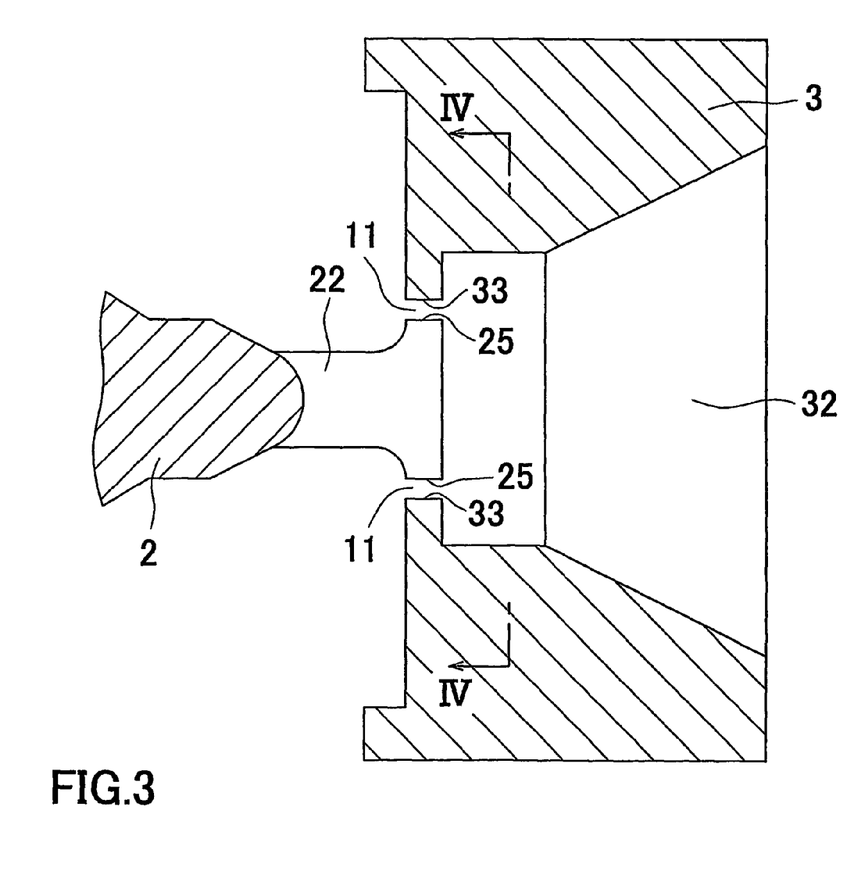
FIG. 3 is a cross-sectional view showing the principal part of the extrusion die in which the female-die and the mandrel are combined.
Figure 4:
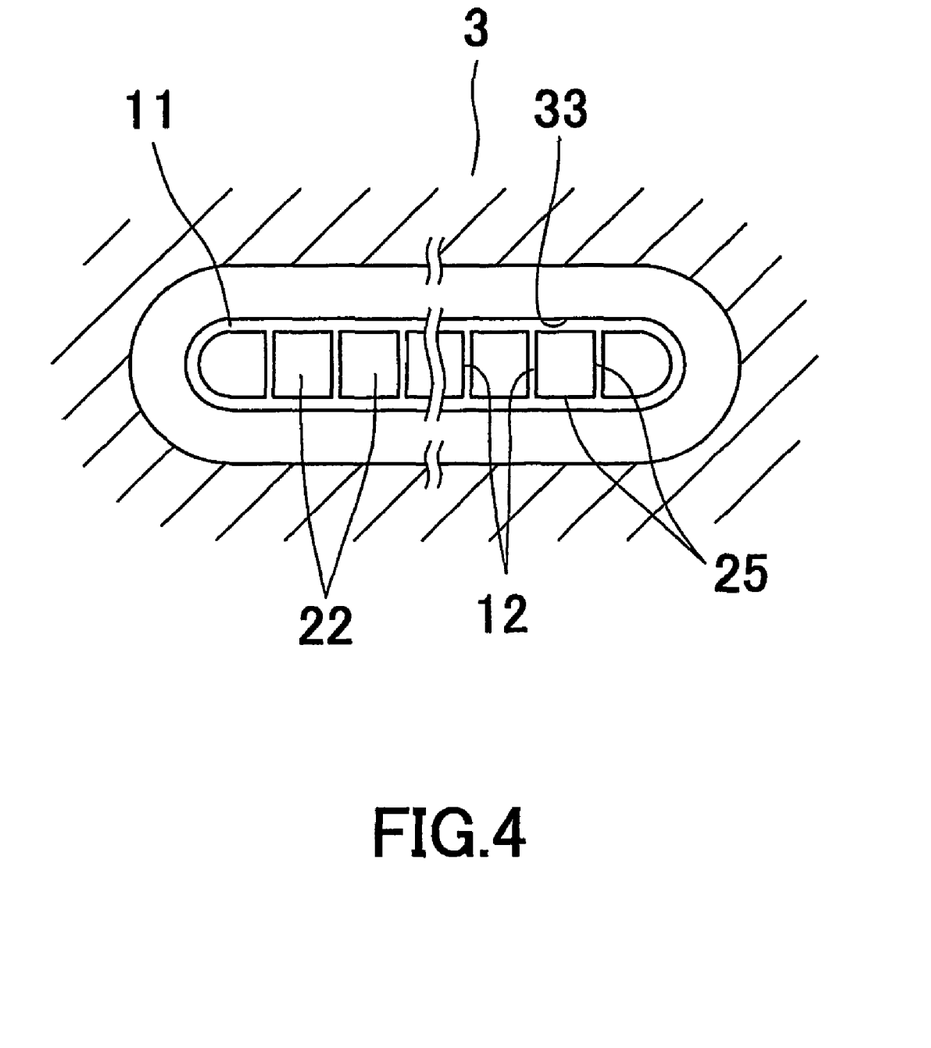
FIG. 4 is a cross-sectional view taken along the line IV-IV of FIG. 3.

FIG. 1A is a perspective view showing a mandrel of the extrusion die according to an embodiment of the present invention. FIG. 2 is a front view showing the female die of the extrusion die as seen from the extrusion direction rear side (inlet side). FIG. 3 is a cross-sectional view showing the principal part of the extrusion die in which the female die and the mandrel are combined and corresponding to the cross-sectional view taken along the line III-III in FIG. 1A. FIG. 4 is a cross-sectional view taken along the line IV-IV in FIG. 3.

As shown in FIGS. 1 to 4, the female die 3 is provided with a flat opening 31 corresponding to the peripheral configuration of the aluminum tube at the central portion of the rear surface thereof. The female die 3 is also provided with an extruded member passing aperture 32 penetrated in the female die 3 in the axial direction and communicated with the flat opening 31. At the edge portion of the female die 3, a bearing portion 33 for specifying a periphery of an aluminum tube is formed.

On the other hand, the mandrel 2 is provided with a flat mandrel main body 21 and a plurality of columnar portions 22 integrally protruded from the tip portion of the mandrel main body 21 in a comb-shaped manner and arranged in the widthwise direction via grooves 12.

The connecting portion 23 between the columnar portions 22 and the mandrel main body 21 is formed to have inclined outer surfaces opposed in the thickness direction thereof (in the up-and-down direction in FIG. 4) and tapered toward the tip, so that the extrusion material positioned at both sides of the mandrel main body 21 opposed in the thickness direction thereof can be easily flowed toward the columnar portions 22 at the time of extrusion.

The columnar portions 22 define the hollow portions 202 of the aluminum tube 200, respectively, and the configuration of each tip portion corresponds to the cross-sectional configuration of each hollow portion 202. The outer periphery of the tip end portion of the columnar portion 22 constitutes a bearing portion 25 defining the inner peripheral surface of the hollow portion of the aluminum tube 200.

Furthermore, in this embodiment, the columnar portion 22 has a constant width from the basal end portion to the bearing portion 25, and the side surfaces 26 (inner surfaces of the groove 12) opposed in the widthwise direction are flat surfaces reaching the bearing portion 25 via no stepped portion.

The configuration of the columnar portion 22 including the groove 12 of the mandrel 2 is formed by a known electric-discharge machining. Furthermore, the opening 31 of the female die 3 is also formed by a known electric-discharge machining. This electric-discharge machining causes a molten residual layer (deformed layer) in the electric-discharge machined surface portion. Accordingly, in this embodiment, the elimination processing of the molten residual layer is executed after the electric-discharge machining by using a predetermined tool, which will be detailed later.

The die 1 is constituted by assembling the mandrel 2 and the female die 3 such that the tip portion of the columnar portion 22 of the mandrel 2 is disposed within the opening 31 of the female die 3 with the bearing portion 25 of the columnar portion 22 facing the bearing portion 33 of the female die 3. If needed, the mandrel 2 may be combined with the female die 3 in a state that the mandrel 2 is fixed to and supported by a supporting member (not shown) by shrinkage fitting.

In this combined state, an aluminum billet as an extrusion material is loaded in a container (not shown) including the die 1, and then the extrusion is performed according to a conventional method. The aluminum extrusion material is forcibly flowed into both sides of the mandrel 2 opposed in the thickness direction thereof by the pressure, and then extruded through the gap 11 between the bearing portions 25 of the columnar portions 22 and the bearing portion 33 of the female die 3. Simultaneously, the material is also supplied to the grooves 12 between the adjacent columnar portions 22 to thereby be extruded through the tip portions of the grooves (the gaps between the bearing portions 25 of the adjacent columnar portions 22). Thus, the aluminum extruded tube 200 having the cross-section as shown in FIG. 8 is manufactured by continuously extruding the material.

The aforementioned mandrel 2 and female die 3 are formed by cutting a die original member into a predetermined configuration and dimensions by electric-discharge machining such as a wire electric-discharge machining or a carving electric-discharge machining. The die material is not limited to a specific one, and may be cemented carbide to which electric-discharge machining can be applied, conductive ceramics, non-conductive ceramics (to which electric-discharge machining can be applied by an auxiliary electrode method), various die steels, etc. The molten residual layers formed on the processed surfaces of the mandrel 2 and the female die 3 made of the aforementioned material are eliminated by using a tool formed by a wire discharge grinding method.

Figure 5:
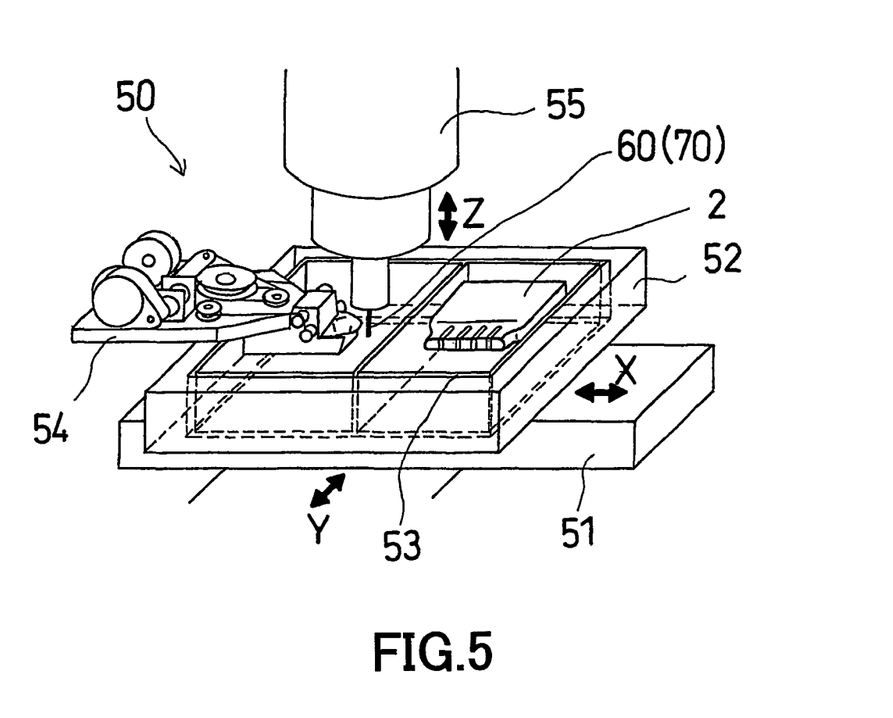
FIG. 5 is a perspective view showing an elimination apparatus for eliminating a molten residual layer which is also used for manufacturing the tool.
Figure 6:
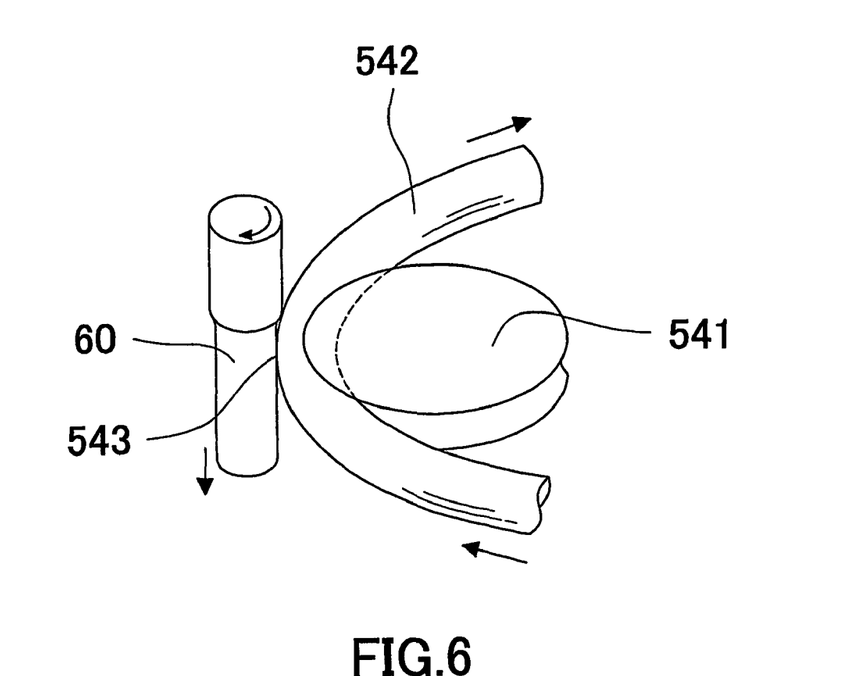
FIG. 6 is a perspective view showing the processing state at the time of manufacturing the tool of the processing apparatus shown in FIG. 5.

FIG. 5 is a perspective view showing a molten residual layer eliminating apparatus. This apparatus is also used as a wire discharge grinding apparatus for making the aforementioned tool. FIG. 6 is an enlarged perspective view showing the tool which is being manufactured as seen from a different angle.

The molten residual layer eliminating apparatus shown in FIG. 5 is provided with a lower stage 51 movable in the Y-axis direction in a horizontal plane, an upper stage 52 provided on the lower stage 51 movable in the X-axis direction in a horizontal plane, a processing tub 53 for filling working-liquid provided on the upper stage 52, a wire discharge grinding unit 54 fixed to the upper stage 52, and the tool setter 55 which can be moved vertically (in the Z-axis direction) and rotated. Thus, the processing tub 53 and the wire discharge grinding unit 54 can be moved within a horizontal plane by the upper and lower stages 51 and 52. At a predetermined position in the processing tub 53, the mandrel 2 as a workpiece whose molten residual layer is to be eliminated is fixed. In this embodiment, the molten residual layers of the inner surfaces 26 of grooves 12 of the mandrel 2 will be eliminated.

First, in manufacturing a tool, a tool material 60 is attached to the lower end portion of the tool setter 55. Furthermore, as shown in FIG. 6, the wire discharge grinding unit 54 is equipped with a wire guide 541 and a metal wire 542 of an about 0.1 mm diameter which slowly moves along the wire guide 541 in a continuous manner. This metal wire 542 is used as a machining electrode, and the opposed portion of the metal wire 542 opposed to the tool material 60 constitutes a discharge portion 543. Thus, by using the wire discharge grinding unit 54, the tool material 60 attached to the tool setter 55 is subjected to the electrical discharge machining.

At the time of this electrical discharge machining, the wire guide 541 supports the wire 542 from the rear side of the tool material 60. Therefore, there is no deterioration of the tool forming accuracy due to the processing (discharge) opposing force at the time of forming the tool. Furthermore, since the wire 542 which is continuously supplied is used as the electrode for forming the tool, the forming can be performed by the surface of the wire 542 which is always new. This means that the forming can be performed without being affected by the influence of electrode material consumption. Accordingly, a minute tool with high accuracy such as 5 microns can be manufactured. Furthermore, since this processing method employs a discharge phenomenon, the method can be applied to any materials regardless of hardness provided that the material has conductivity. Accordingly, the method has advantages that a tool having hardness equivalent to or more than die material, such as sintered diamond, tungsten or cemented carbide can be manufactured easily.

Figure 1B:
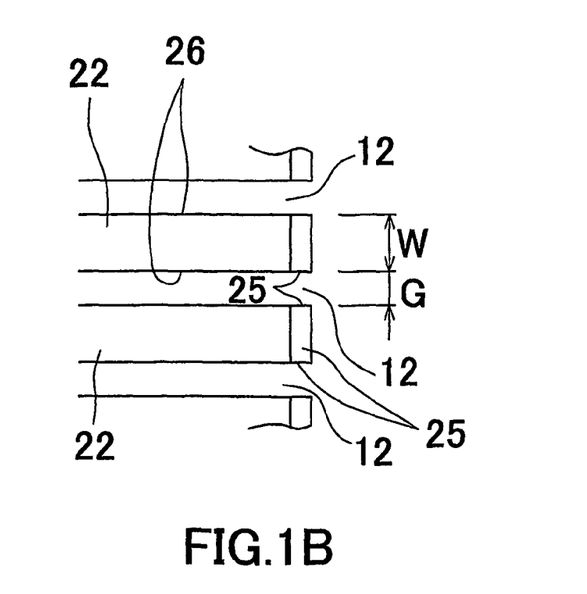
FIG. 1B is a plan view showing the columnar portions of the extrusion die.

In this embodiment, the tool 70 is formed by machining a material such as sintered diamond having hardness equivalent to or more than that of die material into a round cross-section having a diameter smaller than the width G of the groove 12 (see FIG. 1B). The tool 70 having a round cross-section can be formed by performing the wire discharge grinding while rotating the tool material. The cross-sectional configuration of the tool 70 is not limited to a circular configuration, but may be a rectangular cross-sectional configuration or any other configuration for the purpose of enhancing the discharge efficiency of processing wastes to be generated at the time of removing the molten residual layer. For example, a rectangular column-like tool can be formed by processing the side surfaces of the tool material without continuously rotating it.

After manufacturing the tool 70, the elimination processing of the molten residual layer produced in the inner side surfaces (processed side surfaces) 26 of the groove 12 of the mandrel 2 is performed. This elimination treatment is performed by moving the upper and lower stages 51 and 52 so that the portion of the mandrel 2 to be processed is located below the tool 70 and combining the vertical and rotary movements of the tool setter 55 and the movements of the upper and lower stages 51 and 52 within the X-Y plane of the mandrel 2.

Figure 7:
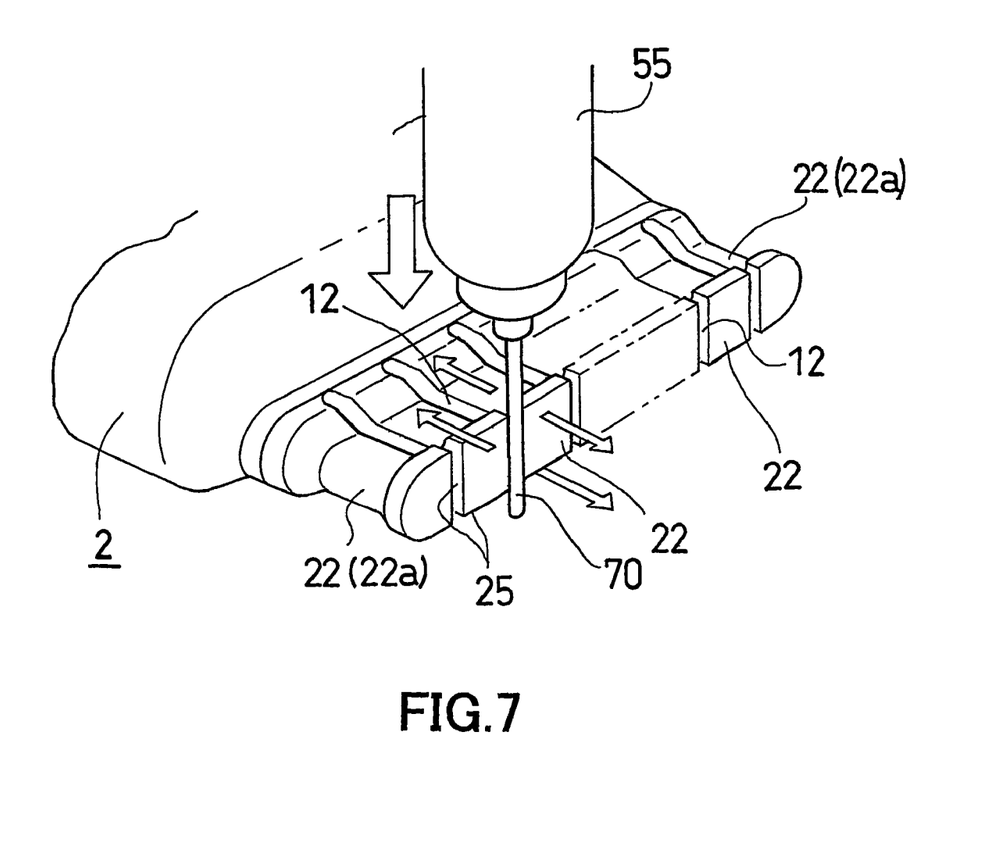
FIG. 7 is a perspective view showing the state in which the molten residual layer is being eliminated using the tool.

FIG. 7 is a perspective view showing the state that the molten residual layer is being eliminated using the tool 70 made by the wire discharge grinding method.

In this embodiment, the tool 70 is inserted in the groove 12 from the tip side thereof so as to contact the inner side 26 of the groove 12. In this state, the tool 70 is moved toward the longitudinal basal end side of the groove 12 as shown in a thin arrow by moving the upper and lower stages 51 and 52 while moving the tool 70 in the depth direction of the groove 12 as shown in the thick arrow by moving the tool setter 55 in the up-and-down direction (Z-axis direction), to thereby completely grind and eliminate the molten residual layer of the inner surface 26 of the groove 12. Since the tool 70 has high-hardness and high-precision, the tool 70 can come into contact with the inner surface of the groove 26 evenly. Therefore, it is possible to remove the molten residual layer while maintaining the dimension of the groove 12 with high precision. Furthermore, since the minute tool 70 can be manufactured, even in cases where the width of the groove 12 is very small, for example, larger than 0.03 mm or more but less than 0.3 mm, the molten residual layer can be removed. The elimination of the molten residual layer using the tool 70 can be preferably applied to a minute configuration including a groove of 0.05 to 0.25 mm width. Furthermore, since the tool 70 has been attached from the manufacturing stage thereof and will never be detached, a generation of unbalanced load due to an eccentric installation of the tool 70 will not occur and therefore the molten residual layer can be uniformly removed.

The grinding removal processing of the molten residual layer, using the aforementioned tool 70 can be performed using or without using abrasive grains. Furthermore, in place of grinding, an ultrasonic machining processing may be employed. This ultrasonic machining processing is a method for eliminating the molten residual layer by giving ultrasonic shaking to the tool 70 in the state that abrasive grains are supplied between the processing surface 26 of the workpiece and the tool 70.

Furthermore, it is not always necessary to perform the elimination processing to the entire electric discharge machining surface. The elimination processing may be performed only to the portion where stress will be concentrated at the time of extrusion and therefore it is damaged easily.

Furthermore, before eliminating the molten residual layer, micro electric-discharge machining may be performed to the surface of the workpiece to be processed as a pretreatment. Since the processing energy of the micro electric-discharge machining method is minute, it is possible to decrease the thickness of the molten residual layer. Furthermore, in order to facilitate the elimination of the molten residual layer by the tool 70, the molten residual layer may be subjected to electrochemical machining (including processing in ion exchange water is included) or surface oxidation treatment to soften the layer.

In the aforementioned embodiment, although the case in which the molten residual layer of the inner surface 26 of the groove 12 of the mandrel 2 is eliminated is exemplified, the molten residual layer of the electric-discharge machined surface of the bearing portion 33, which is an inner peripheral surface of the opening 31 of the female die 3, the mandrel 2 or the female die 3 may be eliminated.

The extrusion die 1 whose molten residual layer of the electric-discharge machined surface was eliminated may be used as it is. Alternatively, the machined surface from which the molten residual layer was eliminated may be subjected to surface treatment for the purpose of enhancing surface characteristics of an article to be extruded. Since the molten residual layer is eliminated evenly with high precision, the adhesion of the surface treated layer increases and the durability thereof improves.

In the aforementioned embodiment, although the a metal molding member is an extrusion die 1, needless to say, the present invention can also be applied to another metal molding members.

EXAMPLE 1

The following tests were performed in order to evaluate the effects of the embodiment.

Four pieces of steel dies each equipped with the mandrel 2 having rectangular columnar portions 22 were prepared in order to extrude an aluminum tube 200 having rectangular hollow portions 202 arranged in the widthwise direction as shown in FIG. 8. The height of the bearing portion 25 of the columnar portion 22 was set to be 0.7 mm; the width thereof (see FIG. 1B) was set to be 0.4 mm; the width G of the groove 12 between the adjacent columnar portions 22 was set to be 0.1 mm; the length of the opening 31 of the female die 3 was set to be 16.0 mm; and the height (width) of the opening 31 was set to be 1 mm. The processing of the die was performed by electrical discharge machining.

As for one of the four dies, the molten residual layer of the electric-discharge machined surface including the inner surface 26 of the groove 12 was eliminated by a grinding method (with no abrasive grain) using a sintered diamond tool (diameter of 0.08 mm) of a round cross-section manufactured by the wire discharge grinding method. The tool 70 made in the state that it was attached to a tool setter 55 was used as it is. As for another one of the four dies, after eliminating the molten residual layer of the electric-discharge machined surface, a surface treatment was performed to thereby form a TiAlN layer with a thickness of 5 μm by a PCVD method.

As for still another one of the four dies, the die after the electric-discharge machined was used as it is without eliminating the molten residual layer.

As for still yet another one of the four dies, the die was subjected to the same surface treatment as mentioned above without eliminating the molten residual layer.

The durability of each of four kinds of dies 1 was evaluated by extruding an aluminum billet. Concretely, the extrusion capacity until at least a part of the mandrel 2 was destroyed was measured. As for the surface treated die, the extrusion capacity until the surface treatment layer of the processed surface was peeled off was measured. The results are shown in FIG. 9.

Figure 9:
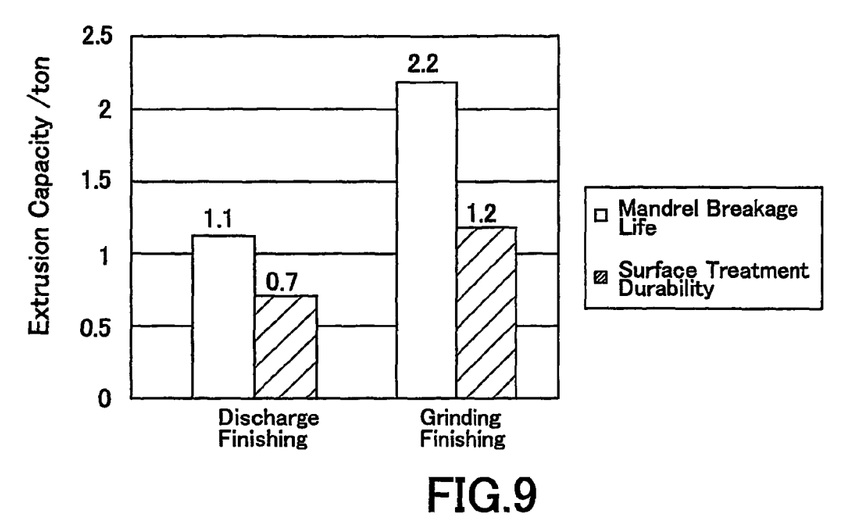
FIG. 9 is a graph showing the results of the life test of the extrusion dies performed in Examples.

In FIG. 9, the die to which elimination processing of a molten residual layer was not performed is indicated as "Discharge Finishing", and the die to which elimination processing of a molten residual layer was performed is indicated as "Grinding Finishing." The numeral above each graph shows an extrusion capacity until the mandrel was destroyed or the surface treatment layer was peeled off.

As will be understood from FIG. 9, in the die to which neither elimination processing of a molten residual layer nor surface treatment was performed, the extrusion capacity was 1.1 ton. To the contrary, in the die to which only elimination processing of a molten residual layer was performed and no surface treatment was performed; the extrusion capacity was 2.2 ton, which reveals that the die life has approximately doubled. Furthermore, in the die to which only surface treatment was performed, the extrusion capacity was 0.7 ton. To the contrary, in the die to which surface treatment was performed after the elimination processing of the molten residual layer, the extrusion capacity was 1.2 ton, which reveals that the durability of the surface treated layer was also improved markedly.

EXAMPLE 2

The same types of dies 1 as in Example 1 were prepared. After the electric-discharge machining, the aforementioned eliminating processing for eliminating the molten residual layer of the processed surface were performed by changing the width G of the groove 12 between the adjacent columnar portions 22, respectively, in the state that the height of the bearing portion 25 of the columnar portion 22 is set to be 0.7 mm and the width W2 of the columnar portion 22 is set to be 0.4 mm. When one of the following problems was confirmed, it was regarded as the limitation of the elimination processing and the value was obtained. The problems include that the electric-discharge machined surface remains on the inner surface 26 of the groove 12 (when the eliminating of the molten residual layer becomes insufficient), that a dull beyond R0.05 is formed at the corner portion of the columnar portion 22, and that the breakage of the mandrel 2 (columnar portion 22) occurs during the elimination processing. The results are shown in FIG. 10.

Figure 10:
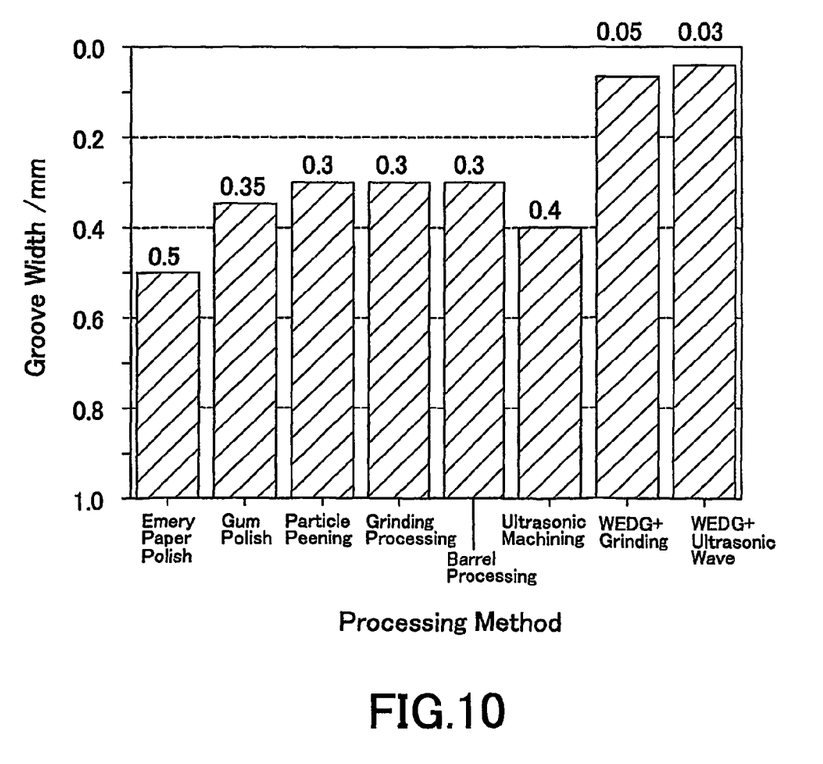
FIG. 10 is a graph showing the results of test for investigating the limitation of processing for eliminating the molten residual layer performed in Examples.

In FIG. 10, the numerical value above each graph shows the width G of the groove 12 at the time of the aforementioned limit. "WEDG+Grinding" in FIG. 10 denotes elimination processing which is grinding processing (with abrasive grains) using the tool made by the wire discharge grinding method according to an embodiment of the present invention. Similarly, "WEDG+Ultrasonic Wave" denotes the elimination processing which is ultrasonic machining using the tool made by the wire discharge grinding method according to an embodiment of the present invention. As a tool 70, the same one as in Example 1 was used.

As shown in FIG. 10, in the embodiments according to the embodiment of the present invention, the limitation of elimination processing of the molten residual layer was 0.05 mm or 0.03 mm in width G of the groove 12. To the contrary, in case of the Emery paper polish, that of the molten residual layer was 0.5 mm; in case of the Gum polish, that of the molten residual layer was 0.35 mm; in case of the Particle peening, that of the molten residual layer was 0.3 mm; in case of the grinding processing using a grinder, that of the molten residual layer was 0.3 mm; in case of the Barrel processing, that of the molten residual layer was 0.3 mm; and in case of the ultrasonic machining, that of the molten residual layer was 0.4 mm.

Thus, it is confirmed that according to the embodiments of the present invention the life of the extrusion die can be extended as compared with a conventional one and elimination processing of the molten residual layer of finer configuration can be attained.

According to the method for processing a metal molding member according to present invention and the method for manufacturing a metal molding member according to the present invention, the molten residual layer produced on the electric-discharge machined surface can be uniformly eliminated with high precision, which in turn can extend the life of the metal molding member. Furthermore, in cases where surface treatment is performed to the metal molding member, degradation of the surface treated layer can be prevented. As a result, a metal molding member such as an extrusion die, which can demonstrate high efficiency for a long period of time, can be provided.

According to the extrusion die of the present invention, the molten residual layer produced in the electric-discharge machined portion can be eliminated by using a minute tool high in processing accuracy and high in hardness. Therefore, the extrusion die can be a long-life die from which the molten residual layer are eliminated evenly with high precision that can demonstrate high efficiency.

According to the method for manufacturing the extruded member of the present invention, since extruding is performed using an extrusion die from which the molten residual layer of an electric-discharge machined portion was uniformly eliminated with high precision, an extruded member which is high in dimensional accuracy and excellent in surface characteristics can be obtained.

According to the extruded member of the present invention, since the extruded member is extruded through the extrusion die from which the molten residual layer of the electric-discharge machined portion was uniformly eliminated with high precision, the extruded member can be high in dimensional accuracy and excellent in surface characteristics.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed

INDUSTRIAL APPLICABILITY

The present invention can be applied to a method for processing a metal molding member having a minute configuration, a method for manufacturing a metal molding member, an extrusion die, a method for manufacturing an extruded member and an extruded member.

The invention claimed is:

1. A method for manufacturing a metal molding member, comprising:
    machining a material to be processed by electric-discharge machining to obtain a metal molding member;
    manufacturing a tool by a wire electrical discharge grinding method; and
    after the electric discharge machining, eliminating a molten residual layer formed on a surface of an electric-discharge machined portion of the metal molding member by using the tool to cause grinding removal of the molten residual layer without abrasive grains, to cause abrasive removal of the molten residual layer by ultrasonic machining or to cause both grinding removal with no abrasive grains and abrasive removal by ultrasonic machining of the molten residual layer; and
    the method further comprising:
    providing a molten residual layer elimination apparatus comprising:

a wire discharge grinding unit configured to perform a wire discharge grinding process, a processing tub configured to contain a workpiece, and a tool setter configured to hold a tool for processing the workpiece;

placing the metal molding member in the processing tub, wherein the metal molding member comprising a minute structure including said surface having the molten residual layer;

placing a tool material in said tool setter;

said manufacturing a tool comprising forming a molten residual layer removal tool by moving the wire discharge grinding unit and the tool setter relative to each other such that the wire discharge grinding unit forms the tool material into the molten residual layer removal tool which is held by the tool setter; and said eliminating comprises removing the molten residual layer from the surface of the minute structure by moving the tool setter and the processing tub relative to each other such that the molten residual layer removal tool which is held by the tool setter removes the molten residual layer from the minute structure by a grinding method.

2. The method of claim 1, wherein the machining a material comprises machining a molded member material comprising cemented carbide material, conductive ceramics material, non-conductive ceramics material, or steel material to form an extrusion die.

3. The method of claim 2, wherein the forming an extrusion die comprises forming a slot in the extrusion die having a width of 0.03-0.3 mm.

4. The method of claim 3, wherein the forming a molten residual layer removal tool comprises forming a tool having a diameter of less than 0.03 mm.

5. The method of claim 4, wherein the forming a molten residual layer removal tool comprises machining a tool material which is harder than the molded member material, said tool material comprising sintered diamond, tungsten or cemented carbide.

6. The method of claim 5, wherein the forming a molten residual layer removal tool consists of forming a cylinder shaped tool.

7. The method of claim 6, wherein said removing the molten residual layer consists of removing the molten residual layer with greater uniformity and accuracy than removal of the molten residual layer by any of an emery paper polish method, a gum polish method, a shot blast method, a barrel processing method, a honing method, an electsolytic polishing method or an elimination method using a common grinder.

* * * * *